(No Model.)

G. BOBB.
LAP RING.

No. 493,543.  Patented Mar. 14, 1893.

WITNESSES:
Fred G. Dieterich
Amos W. Hart

INVENTOR
George Bobb.
BY Munn & Co
ATTORNEYS.

United States Patent Office.

GEORGE BOBB, OF YOKENA, MISSISSIPPI.

LAP-RING.

SPECIFICATION forming part of Letters Patent No. 493,543, dated March 14, 1893.

Application filed October 25, 1892. Serial No. 449,996. (No model.)

*To all whom it may concern:*

Be it known that I, GEORGE BOBB, residing at Yokena, in the county of Warren and State of Mississippi, have invented a new and Improved Lap-Ring, of which the following is a specification.

Heretofore lap-rings have usually been so constructed that their members were more or less difficult to open, or separate, as required to connect or disconnect the rings from other devices. My improvement consists in connecting the two members of the ring by a loose universal or swivel joint which adapts it to be easily and quickly applied to or detached from single and double-trees, chain links &c.

Figure 1:
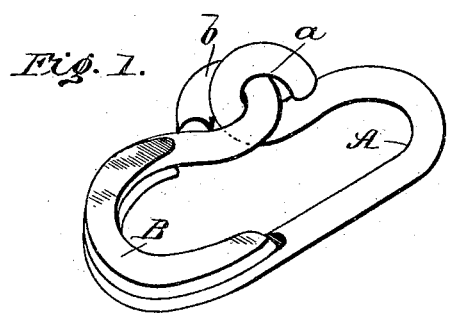
Figure 2:
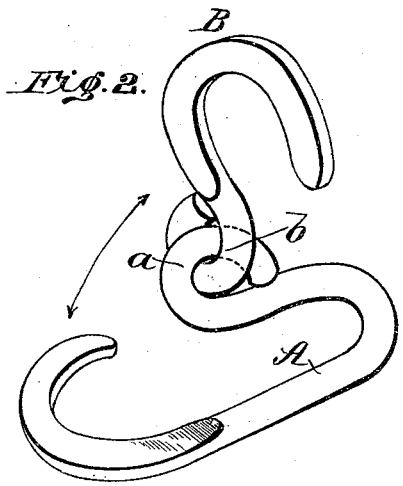

In the accompanying drawings, Figure 1 is a perspective view of my improved lap-ring closed, and Fig. 2 is a perspective view of the same open.

The larger member A of my lap-ring is a hook of essentially oval-shape having one end bent or curved to form an eye $a$. The other member is a short hook B having on one extremity an eye $b$, which engages or interlocks with the eye $a$ of the larger hook A. The said eye $a$ is at a right angle to the plane of the hook A, and projects laterally from the same while the eye $b$ is in the same plane with the hook B. By this construction I form a sort of swivel or practically universal joint which enables the hook B to be turned in any direction with reference to the other and hence the lap-ring is adapted to be readily attached to or detached from any part or device such as a single-tree, or double-tree, or chain link, without the aid of a hammer, chisel, or other tool, which is so often necessary—especially in frosty weather—to separate the members of lap-rings of the usual kind or pattern.

The lap-ring is distinguished not only by this adaptation for convenient and rapid manipulation, but equally by strength and durability, since the joint or connection between the two hooks is not formed by aid of a pin, rivet, or pintle, as usual in this class of devices, but by circular eyes, which are integral portions of the respective hooks.

Having thus described my invention, what I claim is—

As an improved article of manufacture, the lap-ring constructed, as hereinbefore described, of the oval-shaped hook, A, having the integral circular eye, $a$, formed on one of its extremities and projecting laterally from the body of the hook in a plane at right angles to it, and the smaller, shorter hook, B, having a similar integral eye, $b$, in the same plane with its body, the two eyes being interlocked as shown, whereby the smaller hook is adapted to be manipulated in the manner specified.

GEORGE BOBB.

Witnesses:
T. H. RIGBY,
W. M. FOSTER.